Nov. 10, 1964
R. L. CALDWELL
3,156,818
RADIOACTIVE FLUID FLOW MEASURING APPARATUS WITH MEANS
FOR INJECTING A MARKER MATERIAL BETWEEN
THE SOURCE AND DETECTOR
Filed July 25, 1960
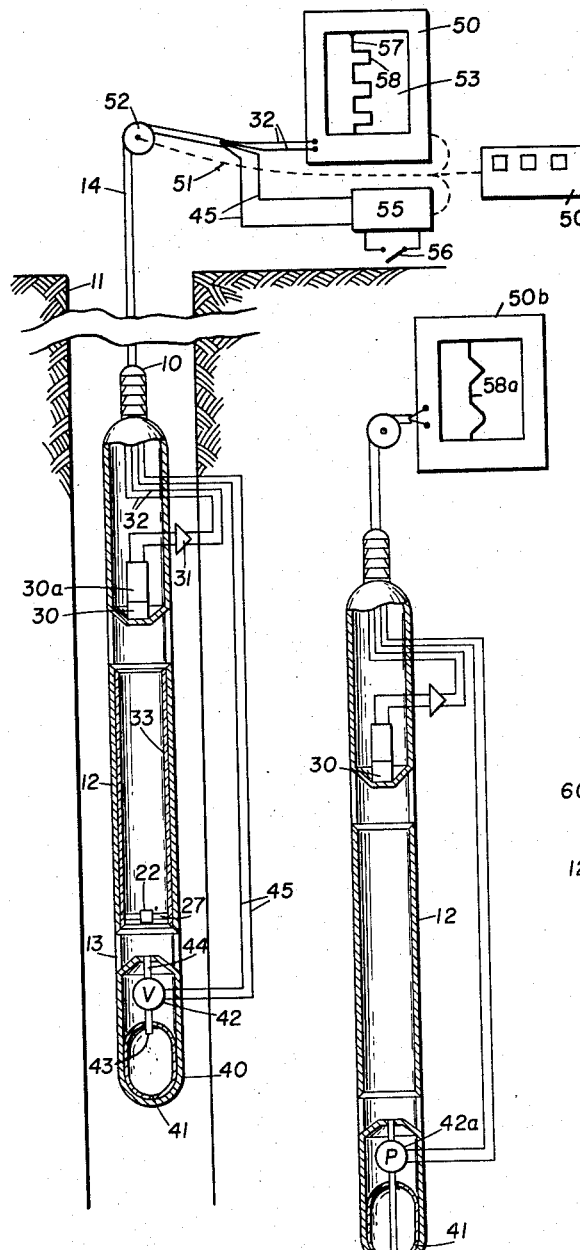
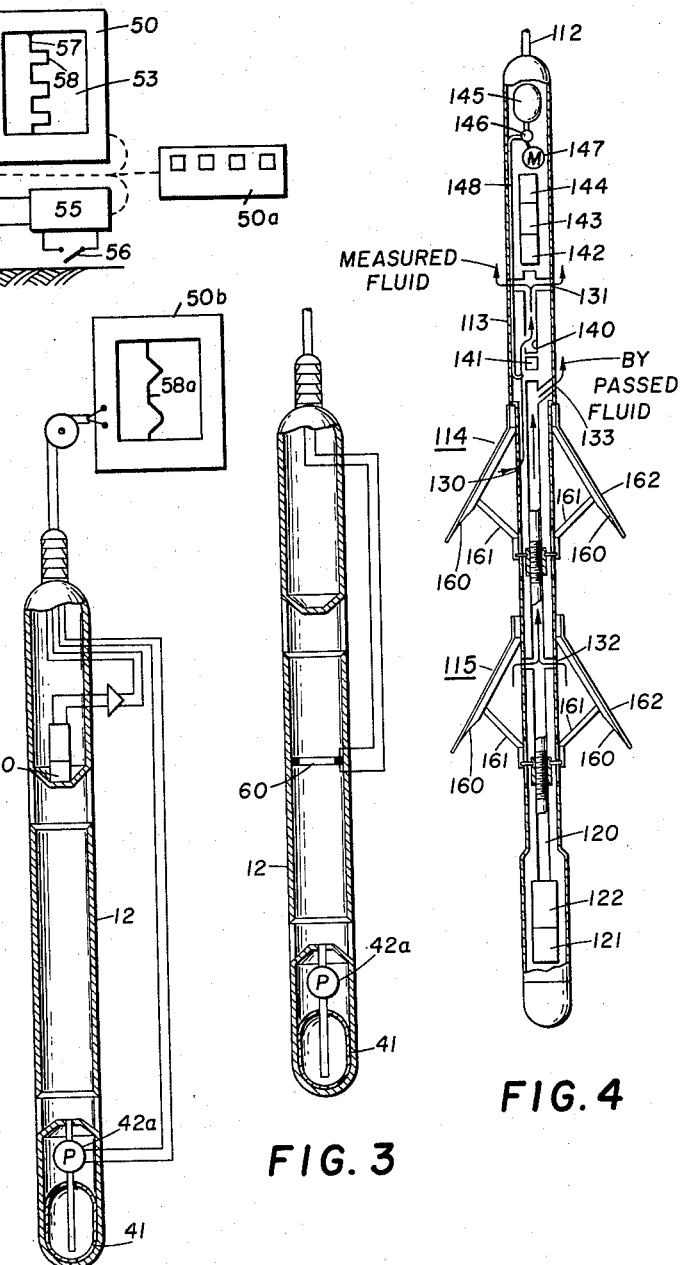
FIG. 1
FIG. 2
FIG. 3
FIG. 4
RICHARD L. CALDWELL
INVENTOR.
BY

United States Patent Office 3,156,818
Patented Nov. 10, 1964

3,156,818
RADIOACTIVE FLUID FLOW MEASURING APPARATUS WITH MEANS FOR INJECTING A MARKER MATERIAL BETWEEN THE SOURCE AND DETECTOR
Richard L. Caldwell, Dallas, Tex., assignor to Socony Mobil Oil Company, Inc., a corporation of New York
Filed July 25, 1960, Ser. No. 45,199
4 Claims. (Cl. 250—43.5)

This invention relates to flow measurement in remote locations as in boreholes, pipelines, and the like and more particularly to a flow metering device in which a marker is periodically injected and sensed upon flow through the device.

In U.S. Patent No. 2,929,455 to Godbey, co-worker of applicant, there is disclosed a system for measuring flow-dependent forces wherein borehole fluids are diverted through a flow channel into a logging instrument and the flow within the channel is measured. While in many instances the above system is wholly satisfactory, it has been considered desirable to be able to provide flow measurements which do not depend directly upon mechanical forces produced by flow.

By the present invention there is provided an improved method and system of measuring flow rates by establishing a measuring zone through which fluids to be measured are directed and periodically establishing in such zone a variation in a condition movable with flow of such fluid. Flow of the fluid propels a marker along the flow channel. An indicating system is then provided for detecting the time variation of a given condition in the flow channel which is a flow-dependent function. By this means it is possible to avoid dependency upon mechanically developed flow forces. Rather, an intrinsic quality of the fluid itself may be modified and sensed in its travel through the unit.

More particularly, in accordance with the present invention there is provided an apparatus for determining the rate of fluid flow which includes structure forming an elongated flow channel adapted to be supported for movement through a fluid-carrying conduit and further adapted to direct fluids through the flow channel. An element which is sensitive to a condition in the fluid is supported with and adjacent to the flow channel. Means responsive to variations in such condition generate an output signal. Means are then provided for injecting material into the fluid upstream of the sensing element to produce a flow-dependent variation in the condition in the fluid as sensed at the location of the sensing element. Means connected to the sensing element are adapted to indicate time variations in the output signal as a result of the flow rate of fluid through the flow channel.

In a specific aspect, the transmission qualities of the fluid with respect to radioactive radiation are modified by the injection of material of contrasting density.

In another specific aspect, the transmission qualities of the fluid with respect to radioactive radiation are modified by the injection of material of higher atomic number than the fluid whose flow rate is being measured.

In accordance with a further aspect of the invention, radioactive material is injected as a marker in the flow stream for the production of a time-variant signal at the output of the sensing element.

For a more complete understanding of the present invention and for further objects and advantages thereof, reference may now be had to the following description taken in conjunction with the accompanying drawing in which:

FIG. 1 diagrammatically illustrates one embodiment of the invention wherein a density variation is employed;

FIG. 2 illustrates a modification of the invention employing a radioactive marker;

FIG. 3 illustrates a further embodiment of the invention wherein electrical conductivity of the fluid is sensed; and FIG. 4 is a diagrammatic illustration of the flow profiling system employing the present invention.

Referring now to FIG. 1, there is illustrated a logging tool 10 positioned in a borehole 11 which is provided with an intermediate section 12 which forms a flow channel for fluids entering the borehole. It is desired to be able to determine the points of ingress of fluids into the borehole and also to determine the rate of flow or the magnitude of flow at various points. As illustrated, fluid from below the tool 10 flows upwardly through the flow channel in the intermediate section 12 and then out through the upper end thereof. Unit 10 is supported by a cable 14 for movement along the borehole so that measurements may be made at any selected location along the length of the borehole as to the rate of flow of fluids therein. Accurate data as to the rate of production from a given formation penetrated by the borehole may thus be provided.

In the embodiment of the invention illustrated in FIG. 1, measurements of fluid flow are made in dependence upon an artificially induced variation in the density of the fluids flowing through the intermediate section 12 by measurement of gamma radiation transmitted through the fluids in section 12. More particularly, the intermediate section 12 comprises a hollow tube, the lower end thereof being provided with openings or inlet ports 13. At a point spaced a short distance above ports 13, a support is provided for a gamma-ray source 22. The source 22 is of relatively small cross section as to provide minimum impedance to fluid flow through intermediate section 12. Thin supporting webs 27 may thus be provided. The webs 27 are suitably connected to the walls of the intermediate section 12. In a preferred embodiment of the invention, the intermediate section 12 is provided with a high-density liner 33 in order to avoid interactive with fluids outside the channel through member 12. A detector chamber is provided in the upper section of unit 10 wherein a detector 30 is mounted. Preferably, detector 30 is a scintillation crystal responsive to gamma radiation emanating from source 22. The crystal 30 is connected by way of amplifier 31, conductors 32, and cable 14 to that portion of the system located at the earth's surface. It will be understood that the housing of the upper section of unit 10 may include a suitable chamber for amplifier 31 and the other portions of the detecting circuit. Preferably, the detector 30 is cylindrical in shape and acts in operation with a photomultiplier tube 30a to provide a voltage for amplification by amplifier 31. By this means, a signal is generated and then transmitted by way of conductors 32 to a recorder at the earth's surface for recording thereof in correlation with the depth of the unit 10 in the borehole. Such a signal may then be relied upon as a measure of the density of fluids inside the flow section 12 intermediate source 22 and the detector crystal 30. By proper shielding through the use of liner 33, it is possible to eliminate the effect of the proximity of the borehole walls. Thus shielded, the borehole 11 may vary in diameter and unit 10 may assume various orientations relative to the walls as it is moved along the borehole 11 without introducing ambiguities in measurements of signals from crystal 30. Transmission will be controlled solely by fluids between source 22 and crystal 30.

A lower section 40 is provided on the borehole tool 10 and includes a container 41 which forms a reservoir of marker material. A valve 42 is connected at its input to a tube 43 extending down into the container 41, and at its output, to a flow channel 44. Flow channel 44 extends upward into the lower end of the intermediate section 12. The valve 42, preferably a remote control valve, is actuated under the control of signals from conductors 45 which extend to the surface in cable 14.

At the earth's surface, conductors 32 are connected to the input terminals of a recorder 50. A linkage 51 is provided between a measuring sheave 52 over which cable 14 passes at the earth's surface and the recorder 50. Through linkage 51, there is provided a depth marker on record 53 produced by recorder 50. With the chart in recorder 50 driven in proportion to depth, the length of the chart may be readily calibrated. It may be desirable to lower unit 10 to a given depth and then, while the depth is maintained constant, operation of the recorder 50 is initated so that the chart is driven independently of depth and is representative of time only. In the latter case, counter 50a may be employed to indicate depth of a given measurement and data on the chart in recorder 50 would be a plot of pulse counting rate (as detected by crystal 30) as a function of chart length, the latter being proportional to and representative of time.

Conductors 45 are connected at the earth's surface to a control unit 55 which may be connected to linkage 51 thereby automatically to energize valve 42 at selected depth intervals. Alternatively, there is provided a switch circuit 56 for manual actuation of valve 42. A switch such as switch 56 may also be actuated as a predetermined function of time when unit 10 is fixed in depth for measurement of flow rate at such depth.

In a preferred mode of operation, the unit 10 will be lowered to a selected depth in the borehole. While at said depth, recorder 50 is energized so that there will be recorded a signal on trace 57 representative of the intensity of gamma radiation detected by crystal 30. In manual operation, switch 56 will then be closed at intervals to energize valve 42 and inject a material into the lower end of the stream passing through intermediate section 12 to modify the transmission qualities of the fluid with respect to gamma radiation. More particularly, the container 41 may be filled with compressed air. The release of a bubble of air as it moves upwardly in the fluid will be at least in part dependent upon the rate of flow of the fluid. During the time interval the bubble is located between source 22 and detector 30, the transmission of gamma rays will be modified to change the signal on trace 57. Such modification is shown by the excursion or square wave 58 on chart 53. This change is representative of the change in gamma rays detected by crystal 30 during transit of a bubble through section 12. Repeated closure of switch 56 at the same location of unit 10 of the borehole or at different locations thus may be desirable to provide indicia of fluid flow rate.

The gas in container 41 need not be air but may comprise such gas as carbon dioxide, nitrogen, or the like. Further, the material injected into the flow stream by actuation of valve 42 may comprise a measured or known quantity of material having a high atomic number (other than water or oil), for example, barium chloride. The material may be either soluble or insoluble as long as it will be carried upward through the intermediate section 12 in the flow stream. So long as fluid of low atomic number, such as oil and water, flows through the tool, the absorption of gamma rays is not strongly dependent upon the chemical composition of the fluid but mainly on the density of the fluid. The introduction of material of high atomic number greatly enhances the absorption of gamma rays from source 22 beyond that due to density increase alone. This is because elements of high atomic number have a high absorption cross section, principally due to photoelectric absorption, for low energy gamma rays.

Extremely high atomic number elements may be injected into the stream near the upper end for gravity flow thereof downwardly through the tool countercurrent to the flow to be measured. However in avoidance of upsetting the flow pattern in channel 12, it will be desirable to use a material of lower density than oil or water. Therefore, gas appears to be most desirable.

Referring now to FIG. 2, there is illustrated a modification of the invention in which the same reference characters have been applied as in FIG. 1. In this embodiment, the container 41 is filled with a radioactive tracer material. There is thus eliminated any counterpart of source 22 of FIG. 1. The injection of material from container 41 as by actuation of a pump 42a will cause a gradual increase in counting rate from crystal 30 as the radioactive material flows upwardly toward the crystal 30. The rate at which count increases may thus be calibrated in terms of velocity in the intermediate section 12 so that flow rate may thus be determined. More particularly, a change in count rate of the character represented by the curve 58a on recorder 50b results from this mode of operation. The slope of the saw-tooth portions of the curve 58a may be calibrated in terms of flow rate.

In FIG. 3, there has been illustrated a further modification in which neither the gamma-ray detector 30 nor the source 22 is employed. Rather, a coil 60 is mounted in the flow channel 12 and is adapted to be responsive to variations in the conductivity of fluids in channel 12. Conductor 41 is filled with a material of conductive character different than that of the fluids flowing through channel 12 so that passage thereof may be sensed by coil 16. A flow-dependent calibration may then be employed to assign a given flow rate to the response of the logging tool to the injection of a slug of material from container 41 by actuation of pump 42a. Alternatively, the container 41 may be filled with material having a magnetic susceptibility which contrasts with that of the flow of the fluid to be measured. A signal from coil 60 may thus be interpreted in terms of such flow as a slug of the latter material passes upward through channel 12.

Referring now to FIG. 4, there is illustrated a system in which a flow profile may be made and in which a given section of borehole may be isolated and flow therefrom measured. More particularly, an upper packer element 114 and a lower packer element 115 are each secured to the housing 113 in such a manner that they may be moved from a completely retracted position to a fully expanded position, as shown in FIG. 4, by means of a hollow drive shaft 120 which is actuated by a motor 121 coupled through a gear box 122 located in the lower portion of the tool body. At times when the tool is being moved through the well bore, the packer elements occupy a completely retracted position. When the tool is at a particular location where fluid measurements are to be taken, the packer elements are in contact with the wall of the wellbore, or if the well is cased, with the internal surface of the casing, in order to provide a packed-off zone between the packer elements. The fluid being measured flows into the tool through ports 130 and emerges from the tool back into the wellbore through ports 131. The fluid within the wellbore below lower packer element 115 enters the tool through ports 132, flows through the tool within the hollow drive shaft 120, and emerges from the tool back into the wellbore through ports 133. The latter fluid may be referred to as the by-passed fluid inasmuch as at no time during passage through the tool does it come in contact with the fluid which enters the tool between the packers and is being measured by the tool.

The fluid which is being measured flows through the tool around drive shaft 120. At a point above the upper terminus of the drive shaft the fluid enters a flow path 140 which extends between a radioactive source 141 and a gamma-ray detector 142, the gamma-ray detector being positioned above the point at which the fluid emerges from the tool through ports 131. In the preferred form of the invention, the gamma-ray detector is a scintillation crystal. The intensity of radiation from source 141 through the fluid in flow path 140 is sensed by the detector 142 to provide a measure of the density of the fluid. Detector 142 is interconnected with a photomultiplier tube 143, an amplifier 144, and through the cable 112 to the surface. The motor 121 which actuates the packer elements is provided with electrical power from the surface by way of cable 112 and connected to the motor through a switching circuit (not shown). A suitable circuit (not shown) provides electrical connections between the cable 112 and both the signal measuring system and the motor 121, as needed during the operation of the tool. During those times when measurements are being taken, the measuring system is connected to the cable 112 by suitable switching means. When motor 121 is to be energized by connection to cable 112 to either expand or retract the packer elements 114 and 115, the measuring system is disconnected from cable 112.

By the utilization of the packer actuated by the motor 121, housed within the tool itself, it is possible to isolate any desired zone within the wellbore while at the same time completely permit ready movement from zone to zone without withdrawal from the wellbore. The supporting structure of the packer elements 114 and 115 comprises a plurality of ribs 160, each of which is secured to a strut 161. All of the ribs 160 are pivotally secured at their upper ends in a fixed position around the tubular housing 113. The lower ends of each of the struts 161 are secured by means of pivot connections around the housing 113 to structure which is actuated relative to the housing by the hollow drive shaft 120. Rotation of the drive shaft 120 causes raising and lowering of the lower ends of struts 161 which effect expansion and retraction of the ribs 160 relative to the tool housing 113 in a manner very similar to the operation of a conventional type umbrella. The ribs 160 are covered with flexible, fluid-impervious diaphragms or membranes 162. The diaphragms 162 are affixed along the outer surfaces of the ribs and are secured at their upper ends around the tool housing 113 so that when the outer, lower ends of the diaphragms are expanded into contact with the walls of a wellbore, substantially fluid-tight seals are effected between the walls of the wellbore and the tool housing by each of the packer elements. The seals thus formed cause the well fluids below the lower packer element 115 to flow through a first fluid flow passage in the tool and back into the wellbore above the upper packer 114. The fluids entering the wellbore between the packer elements are caused to flow through a second fluid flow passage provided with a measuring system and outwardly into the wellbore.

In this modification of the invention, the tool 114 includes a container 145 for a quantity of compressed air or gas which is connected by way of valve 146 to a tube 148. Tube 148 extends downwardly to a point below a gamma-ray source 141. Valve 146 is coupled to a motor 147 which is adapted to be energized, as indicated in connection with FIG. 1, for periodically injecting a bubble of air into the fluids passing upwardly through channel 140, thereby modifying the density of the fluids in a manner which can be sensed.

From the foregoing it will be seen that applicant has provided a system for determining the rate of fluid flow. Structure forming an elongated flow channel is adapted to be supported for movement through a fluid-carrying conduit and is further adapted to direct the fluid in said conduit through said flow channel. An element sensitive to a condition in such fluid is supported with and adjacent the flow channel and is responsive to variations to a condition in the fluid for generating an output signal. Material is periodically injected into the fluid upstream of the sensitive element to produce a flow-dependent variation in the condition of said fluid as detected at the location of the element. The detector is then connected to an indicating means for providing indicia through the utilization of the output signal of the flow rate of the fluid carrying the injected material through the flow channel.

The system above described in connection with FIG. 1 insofar as it relates to measurement of fluid density to provide a density log is described and claimed in applicant's prior application Serial No. 15,026, filed March 10, 1960, U.S. Patent No. 3,123,709.

The specific structure of FIG. 4 for providing a packing operation is described and claimed in application Serial No. 38,315, U.S. Patent No. 3,113,455, filed June 23, 1960, by Raymond W. Sloan and Malcolm O. Johnson, co-workers of applicant.

Having described the invention in connection with certain specific modifications thereof, it will be understood that further modifications will now suggest themselves to those skilled in the art and it is intended to cover such modifications as fall within the scope of the appended claims.

What is claimed is:

1. Apparatus for determining the rate of fluid flow comprising means forming an elongated flow channel adapted to be supported for movement through a fluid-carrying conduit and adapted to direct said fluid through said flow channel, a first element for transmitting radioactive radiation through fluid in said flow channel, a second element spaced apart from said first element along the length of said flow channel and responsive to radioactive radiation transmitted through said fluid for generating an output signal, means for injecting material into said fluid upstream of said second element to produce a flow-dependent variation in the transmission of radioactive radiation through said fluid between said first and second elements, and means connected to said second element for indicating the variations with time of said output signal as a measure of flow rate of said material through said flow channel.

2. Apparatus for determining the rate of fluid flow comprising means forming an elongated flow channel adapted to be supported for movement through a fluid-carrying conduit and adapted to direct said fluid through said flow channel, a first element for transmitting radioactive radiation through fluid in said flow channel, a second element spaced apart from said first element along the length of said flow channel and responsive to radioactive radiation transmitted through said fluid for generating an output signal, means for injecting high-density material into said fluid upstream of said second element to increase the density of a portion of said fluid for travel through said flow channel and attenuate during flow between said first and second elements the transmission of radioactive radiation therebetween, and means connected to said second element for indicating variations with time of said output signal as a measure of the flow rate of fluid in said flow channel.

3. A flow meter which comprises an elongated tubular member having at least a portion thereof forming a longitudinally oriented flow channel with an inlet port and an outlet port, said inlet and said outlet ports being spaced apart along the length of said flow channel, means supported by said tubular member for directing fluids through said flow channel, means adapted to position and support said tubular member in a fluid-carrying conduit at a point remote from the ends of said conduit, a source of gamma radiation adjacent to one end of said flow channel, a detector of gamma radiation adjacent to the other end of said flow channel for generating an output signal representative of the intensity of gamma radiation passing through said fluid between said source and said detector, shielding means around said flow channel to inhibit the effect of materials outside said flow channel on the gamma radiation impinging upon said detector, means for injecting material into said flow channel upstream of said detector having density contrasting with the density of said fluid, and an indicating means connected to said detector for indicating variations with time of gamma radiation impinging upon said detector thereby to provide a flow-dependent indication.

4. A flow meter which includes an elongated tubular member at least a portion of which is hollow and forms a longitudinally oriented flow channel with an inlet port and an outlet port leading thereto, said inlet and said outlet ports being spaced apart along the length of said flow channel, means adapted to support said tubular member for movement through a fluid-carrying conduit for flow through said flow channel of fluid in said conduit, a source of gamma radiation positioned adjacent said inlet port, a gamma radiation detector positioned adjacent said outlet port, a gamma radiation shield forming a liner for said flow channel to minimize the effect of materials outside said flow channel upon gamma radiation impinging upon said detector, a container adapted to be filled with a gas and having a gas outlet in the region of said inlet port, flow control means on said gas outlet for ejecting from said container predetermined quantities of gas to modify the density of the fluid column between said source and detector upon flow of said gas through said flow channel, and means connected to said detector for providing indicia of variation with time of gamma radiation impinging upon said detector to indicate the rate of flow of said gas carried by said fluid through said flow channel.

References Cited in the file of this patent

UNITED STATES PATENTS

| | | |
|---|---|---|
| 2,333,791 | Hutchinson | Nov. 9, 1943 |
| 2,599,975 | Carpenter | June 10, 1952 |
| 2,640,936 | Pajes | June 2, 1953 |
| 2,718,143 | Pankratz | Sept. 20, 1955 |
| 2,739,476 | Atkins | Mar. 27, 1956 |
| 2,841,713 | Howard | July 1, 1958 |
| 2,965,753 | Reynolds et al. | Dec. 20, 1960 |

FOREIGN PATENTS

| | | |
|---|---|---|
| 1,067,598 | France | June 16, 1954 |